(12) United States Patent
Ernsting

(10) Patent No.: US 7,920,259 B2
(45) Date of Patent: Apr. 5, 2011

(54) ARRANGEMENT FOR AN OPTICAL SYSTEM FOR POLARIZATION-DEPENDENT, TIME-RESOLVED OPTICAL SPECTROSCOPY, OPTICAL MEASUREMENT SYSTEMS AND METHOD FOR THE POLARIZATION-DEPENDENT SPECTROSCOPIC ANALYSIS OF MEASUREMENT LIGHT

(75) Inventor: Nikolaus Ernsting, Berlin (DE)

(73) Assignee: Humboldt-Universitat Zu Berlin, Berlin (DE)

( * ) Notice: Subject to any disclaimer, the term of this patent is extended or adjusted under 35 U.S.C. 154(b) by 594 days.

(21) Appl. No.: 11/843,546

(22) Filed: Aug. 22, 2007

(65) Prior Publication Data

US 2008/0239313 A1 Oct. 2, 2008

(30) Foreign Application Priority Data

Aug. 23, 2006 (DE) .......................... 10 2006 039 425

(51) Int. Cl.
*G01J 3/447* (2006.01)
(52) U.S. Cl. ....................................................... 356/327
(58) Field of Classification Search .................. 356/327
See application file for complete search history.

(56) References Cited

FOREIGN PATENT DOCUMENTS

DE 29 10 945 A1 10/1979

OTHER PUBLICATIONS

Ernsting et al. , Femtosecond fluorescence spectroscopy by upconversion with tilted gate pulses, 2005, 7, 1716-1725.*

Lijuan Zhao et al, "Femtosecond Flourescence Spectroscopy by Upconversion with Tilted Gate Pulses", Phys. Chem. Chem. Phys., 2005, pp. 1716-1725.
Will, I. et al., "Compact FROG system useful for measurement of multiterawatt laser pulses," Optics Communications vol. 132 (1996) 101-106.
Matousek, P. et al., "Efficient Rejection of Flourescence from Raman Spectra Using Picosecond Kerr Gating," Applied Spectroscopy vol. 53, No. 12 (1999).
Reid, D.T. et al., "Light-emitting diodes as measurement devices for femtosecond laser pulses," Optics Letters vol. 22, No. 4 (Feb. 15, 1997).
Drögemüller, Karsten, "A Compact Optical Isolator With a Plano-Convex YIG Lens for Laser-to-Fiber Coupling," Journal of Lightwave Technology, No. 2 (Feb. 1989).
Monkman, A. P. et al., "Ultrafast time resolved emission spectroscopy using a Kerr gate," Laser Science Development; Central Laser Facility Annual Report (2002/2003). Matousek, P. et al., "Flourescence suppression in resonance Raman spectroscopy using a high-performance picosecond Kerr gate," Journal of Raman Spectroscopy (2001) 983-988.
Zhao, Lijuan, et al., "Femtosecond flourescence spectroscopy by upconversion with tilted gate pulses," PCCP (2005) 7,1716-1725; Department of Chemistry, Humboldt University, Berlin, Germany.
Arzhantsev, S. et al., "Design and Characterization of a Femtosecond Fluorescence Spectrometer Based on Optical Kerr Gating." Applied Spectroscopy: vol. 59, No. 2, 2005.

* cited by examiner

*Primary Examiner* — Tarifur Chowdhury
*Assistant Examiner* — Abdullahi Nur
(74) *Attorney, Agent, or Firm* — Sutherland Asbill & Brennan LLP

(57) ABSTRACT

The invention is directed to an arrangement for an optical system for polarization-dependent, time-resolved optical spectroscopy, in particular a spectrometer that includes a polarization device which has a crystal polarizer and includes a light entry area which is arranged upstream of the polarization device and which is formed in such a way as to enclose a spatial acceptance angle of the crystal polarizer, and also that includes a light exit area which is arranged downstream of the polarization device, wherein an intermediate area which connects the light entry area and the light exit area is formed in the polarization device with a path length of at most approximately 4 mm which is traversed in the crystal polarizer by light impinging within the spatial acceptance angle.

20 Claims, 1 Drawing Sheet

US 7,920,259 B2

ARRANGEMENT FOR AN OPTICAL SYSTEM FOR POLARIZATION-DEPENDENT, TIME-RESOLVED OPTICAL SPECTROSCOPY, OPTICAL MEASUREMENT SYSTEMS AND METHOD FOR THE POLARIZATION-DEPENDENT SPECTROSCOPIC ANALYSIS OF MEASUREMENT LIGHT

CROSS-REFERENCE TO RELATED APPLICATION

Applicants hereby claim priority under 35 U.S.C. 119(a) to German Patent Application No. 102006039425.9, filed Aug. 23, 2006 the disclosure of which is expressly incorporated herein by reference in its entirety.

The invention relates to an arrangement for an optical system for time-resolved optical spectroscopy, to an optical measurement system and to a method for the polarization-dependent spectroscopic analysis of measurement light, in particular in time-resolved spectroscopy.

BACKGROUND OF THE INVENTION

The imaging of a point-type light source onto a detector is a general problem in optical metrology. If light of all colors is to have the most equal propagation times possible, the light path must run through only a limited distance in refractive material. This is particularly important if the process is carried out in the blue region or even in the near-UV region and a time window $\Delta t \leq 100$ fs (fs=$10^{-15}$ s) is to be cut out across all colors simultaneously. Such arrangements are required in ultrafast spectroscopy. One typical example that may be mentioned is the so-called optical Kerr switch, which is used in time-resolved fluorescence spectroscopy and in Raman spectroscopy. Another example is the so-called "fluorescence upconversion" for the simultaneous observation of all relevant wavelengths.

The present invention relates in particular to all types of optical spectroscopy, including in conjunction with microscopy, which aim to achieve sub-picosecond time resolution of measurement light, be this spontaneously emitted light or transmitted light, preferably using an optical switch, wherein the latter is arranged between two crossed polarizers for the purpose of effective functioning. The cancellation ratio $\epsilon = T_\parallel / T_\perp$ of the first polarizer to the subsequent polarizer ("analyzer"; $T_\parallel, \perp$=transmission of the parallel or perpendicular setting) defines the signal-to-noise ratio (S/N), i.e. the sensitivity of the respective measurement.

The highest level of cancellation, $\epsilon_{GLP} > 10^6$, can be achieved with Glan polarizers (GLPs). These function as a result of birefringence in calcite crystals; their thickness is in principle approximately the same size as the width of the entry window, and the light beams may differ from the window normal in an acceptance angle of only up to ±2.5°. Glan polarizers are therefore used only in the parallelized beam path.

If a lot of light is to be collected, the parallelized beam diameter is naturally large, and so too then is the thickness of the calcite to be traversed, which limits time resolution and simultaneity. FIG. 2 analyses by how many picoseconds the light follows (lags behind) a reference pulse at 400 nm in the case of different wavelengths. For this it has been assumed that a 10 mm GLP is traversed. It can be seen that the spectral region from 320 nm to 450 nm which is of interest in biology is spread over a time window of 2.0 ps. For a time window of considerably <1 ps, therefore, the conventional type of GLP cannot be used.

The arrangements which are customary at present therefore use so-called wire grid polarizers (WGPs), the glass substrate of which may be less than 1 mm thick. However, the cancellation ratio thereof is only approximately $\epsilon_{WGP} \approx 10^3$-$10^4$, three orders of magnitude below the cancellation that can be achieved with GLPs. The sensitivity of a polarization-dependent measurement is accordingly lower. For example, the S/N of time-resolved fluorescence spectroscopy using a Kerr switch is limited mainly by this shortcoming.

The observation of rapidly changing colors, be it during absorption or fluorescence measurements, is a frequently recurring measurement task. "Rapidly" in this connection means a time resolution of as far as possible less than 100 fs. In a fluorescence measurement (cf. L. Zhao et al., PCCP 7, 1716, 2005), a WGP, followed by a GLP, is used in order to suppress undesired background.

SUMMARY OF THE INVENTION

The object of the invention is to provide an improved arrangement for an optical system for polarization-dependent, time-resolved optical spectroscopy and also an improved method for the polarization-dependent spectroscopic analysis of measurement light, by means of which spectroscopic analyses with high time resolution can be carried out in an optimized manner.

According to the invention, this object is achieved by an arrangement for an optical system for polarization-dependent, time-resolved optical spectroscopy according to independent claim 1, an optical measurement system according to independent claim 12, and a method for the polarization-dependent measurement of measurement light according to independent claim 13.

The invention encompasses the concept of using, for polarization-dependent spectroscopy with high time resolution, a polarization device with a crystal polarizer in which the impinging light (measurement light) traverses in the crystal polarizer a path length of at most approximately 4 mm which has to be traversed. The invention has succeeded in improving the signal-to-noise ratio in time-resolved optical analyses by up to three orders of magnitude compared to spectroscopic measurements in which the proposed polarization device has not been used, without reducing the time resolution.

One preferred further development of the invention provides that the intermediate area is formed with a path length of at most approximately 2 mm and more preferably of at most approximately 1 mm which has to be traversed in the crystal polarizer.

In one advantageous embodiment of the invention, it may be provided that the crystal polarizer is a Glan polarizer, which in one preferred embodiment is formed with two crystal wedges.

One advantageous embodiment of the invention provides that the path length which has to be traversed in the crystal polarizer is formed in the region of overlapping corner areas of crystal wedges of the crystal polarizer. By way of example, crystal wedges made from calcite may be used, with the wedge edges being designed to be as sharp as possible.

Preferably, one further development of the invention provides that the crystal wedges can be displaced relative to one another in order to adjust the path length which has to be traversed in the crystal polarizer.

In one advantageous embodiment of the invention, it may be provided that an optical imaging system is arranged upstream of the polarization device and is designed to couple impinging light into the spatial acceptance angle in the light entry area. The spatial acceptance angle is a parameter which characterizes the crystal polarizer and which in particular is material-dependent. The acceptance angle is known as such for various polarizer materials and configurations. The optical imaging system may for example comprise a combination of two non-axial parabolic mirrors. The use of a Schwarzschild objective, which is constructed axially with spherical mirrors or of an "asymmetric mirror objective" derived therefrom may also be provided.

One further development of the invention may provide that the optical imaging system is a magnifying imaging system with a magnification ratio of at least 1:5 and preferably of at least 1:10.

One preferred further development of the invention provides that the optical imaging system is formed with at least two reflection devices which in each case have a curved reflection surface.

In one advantageous embodiment of the invention, it may be provided that a diaphragm device which restricts the light diameter is arranged upstream of the polarization device, said diaphragm device optionally being arranged upstream of and very close to the polarization device. Here, the diaphragm device may be arranged directly adjacent to the polarization device.

One advantageous embodiment of the invention provides that the path length which has to be traversed in the crystal polarizer is formed so as to correspond to the order of magnitude of a diameter of a diaphragm aperture of the diaphragm device.

Preferably, one further development of the invention provides that the path length which has to be traversed in the crystal polarizer is approximately equal to the value, preferably corresponds to at most twice the value, of the diameter of the diaphragm aperture of the diaphragm device. The diaphragm device used may be for example a pin-hole diaphragm, wherein the diameter of the diaphragm aperture is optionally designed to be adjustable.

With regard to the method, one further development of the invention may provide that the measurement light is conveyed in the crystal polarizer along a path length of at most approximately 2 mm and more preferably of at most approximately 1 mm which has to be traversed.

With regard to the method, one preferred further development of the invention provides that the measurement light is conveyed through the crystal polarizer in the region of overlapping corner areas of crystal wedges.

In one advantageous embodiment of the invention, it may be provided that the path length which has to be traversed is adjusted by displacing the crystal wedges relative to one another so that an overlap of the overlapping corner areas or edge areas is varied.

One advantageous embodiment of the invention provides that the measurement light is coupled into the spatial acceptance angle in the light entry area by an optical imaging system which is arranged upstream of the polarization device.

Preferably, one further development of the invention provides that the optical imaging system which is used is a magnifying imaging system with a magnification ratio of at least 1:5 and preferably of at least 1:10.

In one advantageous embodiment of the invention, it may be provided that the measurement light is conveyed through a diaphragm device which is arranged upstream of the polarization device and restricts the light diameter, said diaphragm device optionally being arranged upstream of and very close to the polarization device.

One further development of the invention may provide that the path length which has to be traversed by the measurement light in the crystal polarizer is set so as to correspond to the order of magnitude of a diameter of a diaphragm aperture of the diaphragm device.

One preferred further development of the invention provides that the path length which has to be traversed by the measurement light in the crystal polarizer is set so as to be approximately equal to the value, preferably so as to correspond to at most twice the value, of the diameter of the diaphragm aperture of the diaphragm device.

One advantageous embodiment of the invention provides that the measurement light is analyzed in a time-resolved manner by an optical device which comprises the polarization device and which is selected from the following group of optical devices: resonance Raman spectrometer, time-resolving Raman spectrometer, time-resolving spectrometer for fluorescence, absorption and diffuse reflection.

DESCRIPTION OF DRAWINGS

The invention will be explained in more detail below on the basis of examples of embodiments and with reference to figures of a drawing, in which.

DETAILED DESCRIPTION OF INVENTION

A low-dispersion objective, which consists of two parabolic mirrors M1 and M2, images the fluorescent zone S in a highly magnified manner onto an image plane. To this end, either the two parabolic mirrors M1, M2 are arranged non-axially, or alternatively a Schwarzschild objective, which is constructed axially from spherical mirrors, or an "asymmetric mirror objective" derived therefrom may be used for this purpose.

Located in the image plane is a pin-hole diaphragm L, the diameter of which is d. Fluorescent light coming from the fluorescent zone S impinges on the pin-hole diaphragm L, and only the portion of the fluorescent light that has been allowed through is used for the subsequent measurement. Conversely, this means that only a small portion of the fluorescent zone S is considered. In this sense, therefore, a confocal microscopy arrangement is formed. The arrangement is also highly suitable for laser scanning confocal microscopy.

A thin Glan polarizer P is located just behind the pin-hole diaphragm L. Said polarizer consists of two calcite wedges which are suitably oriented and cut, i.e. the crystal axis is parallel to the entry surface and in the direction of the prism wedge. Contrary to the conventional design, the prism surfaces, which form an angle of approximately 39° with one another, are in each case designed so that a sharp cut of the two surfaces takes place (the so-called wedge edge). The two hypotenuse surfaces are arranged so as to overlap (cf. enlarged detail in FIG. 1). The overlap is designed so as to result in a material thickness of the order of magnitude of d. The path length to be traversed by the fluorescent light is set to at most approximately 4 mm, preferably to at most approximately 2 mm and more preferably to at most approximately 1 mm or less. The two prism wedges can be displaced relative to one another by means of adjustment elements (not shown), such as piezo elements or stepping motors for example, in order to adjust the path length which has to be traversed by the fluorescent light. The path length which has to be traversed is preferably set so as to correspond to a desired time resolution of the measurement (cf. in this respect also the explanations relating to FIG. 2 below).

The magnification by the two parabolic mirrors M1, M2 is selected in such a way that the full angle $2\alpha$ at the pin-hole diaphragm L corresponds to the acceptance angle $\alpha<2.5°$ of the Glan polarizer P. Depending on the choice of the two parabolic mirrors M1, M2, a magnification ratio of at least 1:5, preferably of at least 1:10 is used.

Figure 1:
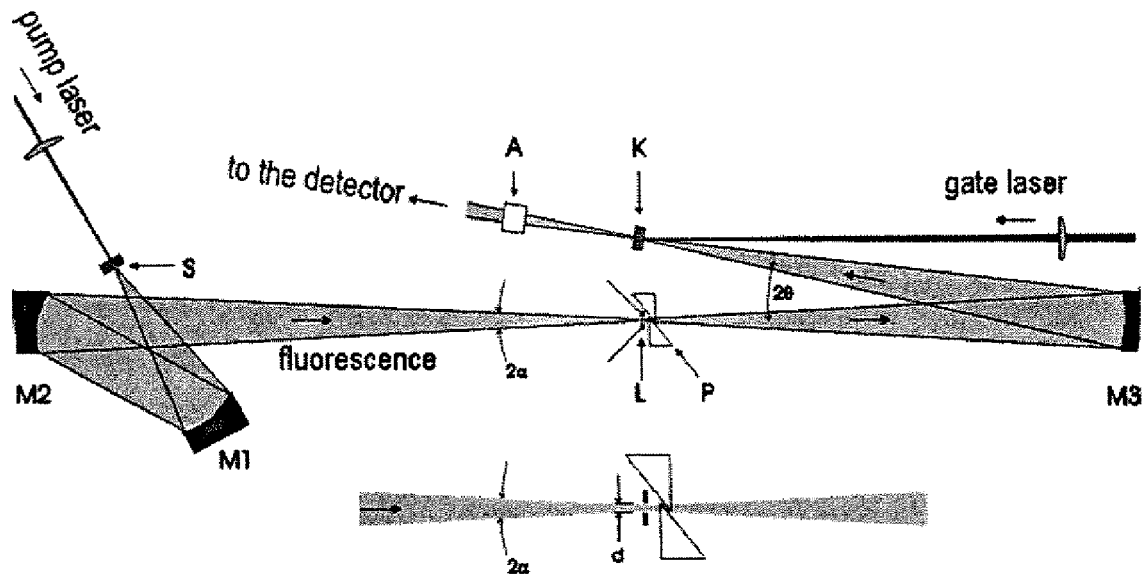
FIG. 1 shows a schematic diagram of an optical measurement system for time-resolved spectroscopy, for example, fluorescence measurements.

As shown in FIG. 1, the thin Glan polarizer P and the combination thereof with magnifying low-dispersion optics S-M1-M2-L are formed in such a way as to thereby increase the contrast of an optical switch K for extremely high simultaneous time resolution by the factor $\epsilon_{GLP}/\epsilon_{WGP} \approx 1000$. Optical switches according to the Kerr principle or via sum frequency generation (SFG) are known as such in various configurations. In the optical measurement system in FIG. 1, the switch as a whole consists of the arrangement P-K-A, namely the thin Glan polarizer P, the optical switch K and an analyzer A, which is a calcite polarizer that is crossed with respect to the Glan polarizer P. Here, the optical switch K is a suitable non-linear optical medium. The light from the pin-hole diaphragm L is imaged onto the optical switch K, which is namely best achieved using a spherical mirror M3 which is used in an almost confocal manner. However, other arrangements may also be provided, for example an elliptical mirror or two parabolic mirrors with a small angle of incidence in each case. In order to avoid astigmatism, an angle of incidence $\Theta$ is kept as small as possible.

If the optical switch K is not affected by an intensive laser pulse and the analyzer A is precisely crossed with respect to the Glan polarizer P, the final effect achieved is that no fluorescent light is transmitted through the unit P-K-A. Specifically, however, impinging residual light is still transmitted, namely the fraction $1/\epsilon_{GLP}$. The latter forms the unavoidable background of each measurement. However, for the described arrangement the background is only approximately $\frac{1}{1000}$ of that achieved presently with conventional polarization arrangements for sub-picosecond time resolution. Located behind the analyzer A is the detector, which usually consists of a spectrograph and a sensitive camera, for example a CCD camera.

A short gate laser pulse, the polarization of which forms an angle of approximately 45° with respect to the polarization defined by the Glan polarizer P, is passed to the non-linear optical medium of the optical switch K at the same time as the fluorescent light, at a controlled point in time. As a result, the combination P-K-A is transparent for the short time of the gate laser pulse. During this time window, the fluorescent light is allowed through (Kerr principle) or converted (SFG—sum frequency generation), but only during this time, and thereafter is spectrally dispersed and finally detected by the detector.

The invention will be further explained below on the basis of typical spectroscopic applications.

Figure 2:
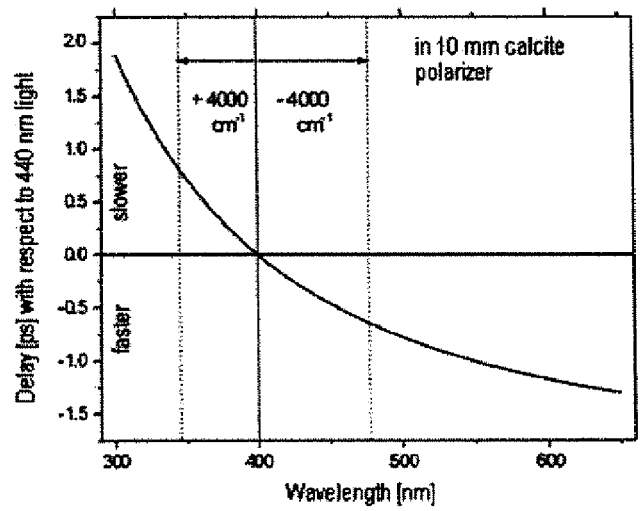
FIG. 2 shows a graph of the propagation time delay as a function of the wavelength in a 10 mm Glan polarizer made from calcite relative to a reference pulse at a wavelength of 400 nm.

FIG. 2 shows a graph of the propagation time delay as a function of the wavelength in a 10 mm Glan polarizer made from calcite relative to a reference pulse at a wavelength of 400 nm. The graph shows by how many picoseconds light lags behind (positive delay, slower) or precedes (negative delay, faster) a reference pulse at 400 nm in the case of different wavelengths. It is assumed here that a 10 mm GLP made from calcite is traversed. In general, the delay is proportional to the path length which has to be traversed in the refractive material.

Two examples will be discussed below. In Raman spectroscopy of biological samples, it is purposeful according to a first example to use an excitation wavelength of approximately 400 nm, since the sought Raman signal is expected through resonance or pre-resonance to be some orders of magnitude higher than with red excitation light. The spectral region of interest, around 400 nm, encompasses on the energy scale $\pm 4000$ cm$^{-1}$, which corresponds to the wavelength range from 344 nm to 476 nm (vertical dashed lines in FIG. 2). In 10 mm calcite, this spectral region is spread in time terms over 1.45 ps. An optical gate which is to allow the Raman signal through must be open for at least this length of time. Such gate methods are generally used in Raman spectroscopy to minimize fluorescent background from the analyzed sample. The fluorescent signal which is allowed through is linearly dependent on the gate duration. In the illustrated case, the gate duration with a GLP of 1 mm path length would be just 0.145 ps, and the contrast of the Raman signal would thus be increased 10-fold.

Another method of avoiding background uses the stimulation of the Raman signal with a short pulse of white light. The latter represents the effective temporal gate and, due to the way in which it is generated, naturally has a duration <150 fs. Temporal spread of this measurement light in a conventional GLP leads to the situation where the adaptation to the pump pulse for the Raman signal can no longer be made optimal (i.e. for an achievably high signal). In this case, too, the use of a GLP of just 1 mm layer thickness of the polarizer is a quantitative advantage.

According to a second example, the emission of tryptophan (Trp) is used in the fluorescence spectroscopy of biological samples. Tryptophan is the only fluorescent natural amino acid, and its fluorescence spectrum is highly dependent on the environment. In this case the spectral region of interest includes wavelengths from 320 nm to 475 nm. With a 10 mm GLP made from calcite, the Trp fluorescence is spread over a time window of 2.0 ps. With such an arrangement, the spectral shifts of interest in the sub-picosecond range can be monitored only with great difficulty. These shifts contain dynamic information about the environment, such as for example the reorientation of adjacent water with a characteristic time constant of approximately 1 ps. Only if the crystal thickness of the GLP is reduced to approximately 1 mm can this information be obtained with time-resolving, polarization-dependent Trp fluorescence spectroscopy.

The following estimate can be given for example for the relevant biological problems and corresponding spectral regions:

A traversed length of the calcite GLP polarizer of approximately 4 mm allows sub-picosecond time resolution, i.e. the temporal scope of the apparatus function is approximately 0.5 ps.

With a path length of approximately 2 mm in the GLP, the time resolution of approximately 250 fs is sufficient for monitoring the rapid, attenuated movement of e.g. accumulated water or rotating groups of molecules.

With a path length in the GLP of approximately 1 mm, the time resolution reaches the 100 fs range. Low-frequency molecule vibrations (up to approximately 300 cm$^{-1}$) can thus be observed based on a frequency modulation of the fluorescence bands.

However, other spectroscopic types of measurement light can also be analyzed in an analogous manner, for example transmission light or reflected light. It may also be provided that the measurement light to be analyzed is passed to the crystal polarizer (Glan polarizer P) without using an imaging system, if the light can be coupled in within the acceptance angle.

The features of the invention which are disclosed in the above description, the claims and the drawing may be important both individually and in any combination for implementing the invention in its various embodiments.

The invention claimed is:

1. An optical system for polarization-dependent, time-resolved optical spectroscopy, comprising:
a polarization device which has a crystal polarizer and comprising a light entry area which is arranged upstream of the polarization device and which is formed in such a way as to enclose a spatial acceptance angle of the crystal polarizer;
a light exit area which is arranged downstream of the polarization device, wherein an intermediate area which connects the light entry area, and the light exit area is formed in the polarization device with a path length of at most approximately 4 mm which has to be traversed in the crystal polarizer by light impinging within the spatial acceptance angle; and
wherein the path length which has to be traversed in the crystal polarizer is formed in the region of overlapping corner areas of crystal wedges of the crystal polarizer.

2. The system according to claim 1, wherein the intermediate area is formed with a path length of at most approximately 2 mm and more preferably of at most approximately 1 mm which has to be traversed in the crystal polarizer.

3. The system according to claim 1, wherein the crystal polarizer is a Glan polarizer.

4. The system according to claim 1, wherein the crystal wedges can be displaced relative to one another in order to adjust the path length which has to be traversed in the crystal polarizer.

5. The system according to claim 1, wherein an optical imaging system is arranged upstream of the polarization device and is designed to couple impinging light into the spatial acceptance angle in the light entry area.

6. The system according to claim 5, wherein the optical imaging system is a magnifying imaging system with a magnification ratio of at least 1:5 and preferably of at least 1:10.

7. The system according to claim 5, wherein the optical imaging system is formed with at least two reflection devices which in each case have a curved reflection surface.

8. The system according to claim 1, wherein a diaphragm device which restricts the light diameter is arranged upstream of the polarization device, said diaphragm device optionally being arranged upstream of and very close to the polarization device.

9. The system according to claim 8, wherein the path length which has to be traversed in the crystal polarizer is formed so as to correspond to the order of magnitude of a diameter of a diaphragm aperture of the diaphragm device.

10. The system according to claim 9, wherein the path length which has to be traversed in the crystal polarizer is approximately equal to the value, preferably corresponds to at most twice the value, of the diameter of the diaphragm aperture of the diaphragm device.

11. The system according to claim 1, wherein the optical device is one of a resonance Raman spectrometer, time-resolving Raman spectrometer, time-resolving spectrometer for fluorescence, absorption or diffuse reflection.

12. A method for the polarization-dependent spectroscopic analysis of measurement light, in particular in time-resolved optical spectroscopy comprising:
coupling the measurement light into a light entry area and, after traversing an intermediate area which connects the light entry area and a light exit area, exits through the light exit area as polarized measurement light, and
conveying the polarized measurement light at least partially to a detector, wherein the polarized measurement light is conveyed in the light entry area into a spatial acceptance angle of a crystal polarizer which forms part of a polarization device and then through the polarization device, and wherein the measurement light is conveyed in the crystal polarizer in a region of overlapping corner areas of crystal wedges along a path length of at most approximately 4 mm which has to be traversed.

13. The method according to claim 12, wherein the measurement light is conveyed in the crystal polarizer along a path length of at most approximately 2 mm and more preferably of at most approximately 1 mm which has to be traversed.

14. The method according to claim 12, wherein the path length which has to be traversed is adjusted by displacing the crystal wedges relative to one another so that an overlap of the overlapping corner areas is varied.

15. The method according to any one of claims 12, wherein the measurement light is coupled into the spatial acceptance angle in the light entry area by an optical imaging system which is arranged upstream of the polarization device.

16. The method according to claim 15, wherein the optical imaging system which is used is a magnifying imaging system with a magnification ratio of at least 1:5 and preferably of at least 1:10.

17. The method according to any one of claims 12, wherein the measurement light is conveyed through a diaphragm device which is arranged upstream of the polarization device and restricts a light diameter, said diaphragm device optionally being arranged upstream of and very close to the polarization device.

18. A method according to claim 17, wherein the path length which has to be traversed by the measurement light in the crystal polarizer is set so as to correspond to the order of magnitude of a diameter of a diaphragm aperture of the diaphragm device.

19. The method according to claim 18, wherein the path length which has to be traversed by the measurement light in the crystal polarizer is set so as to be approximately equal to the value, preferably so as to correspond to at most twice the value, of the diameter of the diaphragm aperture of the diaphragm device.

20. The method according to claim 12, wherein the measurement light is analyzed in a time-resolved manner by an optical device which comprises one of a resonance Raman spectrometer, time-resolving Raman spectrometer, time-resolving spectrometer for fluorescence, absorption or diffuse reflection.

* * * * *